United States Patent
Fujioka

[11] Patent Number: 4,488,788
[45] Date of Patent: Dec. 18, 1984

[54] SMALL-SIZE WIDE ANGLE LENS

[75] Inventor: Yoshisato Fujioka, Higashikurume, Japan

[73] Assignee: Ricoh Company, Ltd., Tokyo, Japan

[21] Appl. No.: 475,066

[22] Filed: Mar. 14, 1983

[30] Foreign Application Priority Data

Mar. 12, 1982 [JP] Japan .................. 57-39242

[51] Int. Cl.³ .............................. G02B 9/60
[52] U.S. Cl. ..................... 350/465; 350/455
[58] Field of Search ............ 350/465, 454, 455

[56] References Cited
U.S. PATENT DOCUMENTS 4,429,958  2/1984  Yamaguchi ............... 350/455

Primary Examiner—John K. Corbin
Assistant Examiner—P. M. Dzierzynski
Attorney, Agent, or Firm—Oblon, Fisher, Spivak, McClelland & Maier

[57] ABSTRACT

Improvement in a small-size wide angle lens having a refractive power arrangement of so-called telephoto type, which has been demanded to meet the need of miniaturization of cameras. The lens of this type is composed of a front group having a positive refractive power and a rear group of negative meniscus lenses wherein a convex surface thereof is directed towards the image and greatly curved. In accordance with the present invention, there is provided a small-size wide angle lens wherein said rear group comprises two negative meniscus lenses, and the specific conditions are imposed on the lenses of said rear group to thereby make the aperture ratio small and provide well-corrected various aberrations, particularly, coma aberration.

1 Claim, 21 Drawing Figures

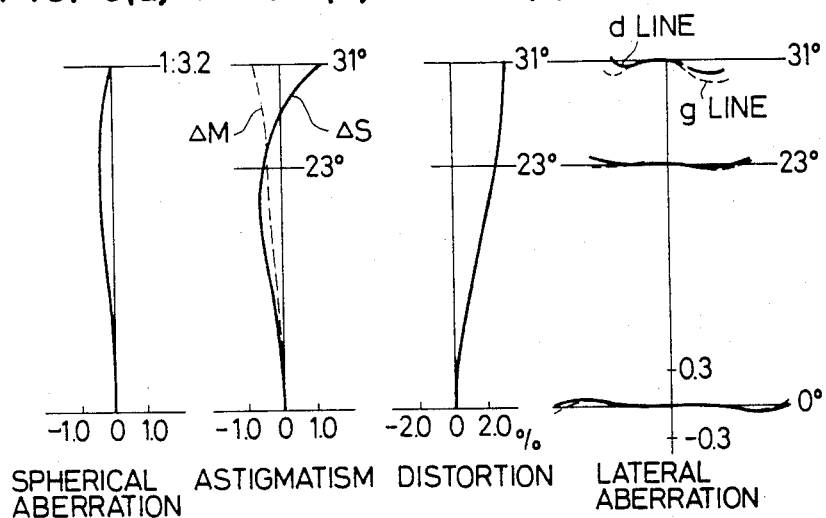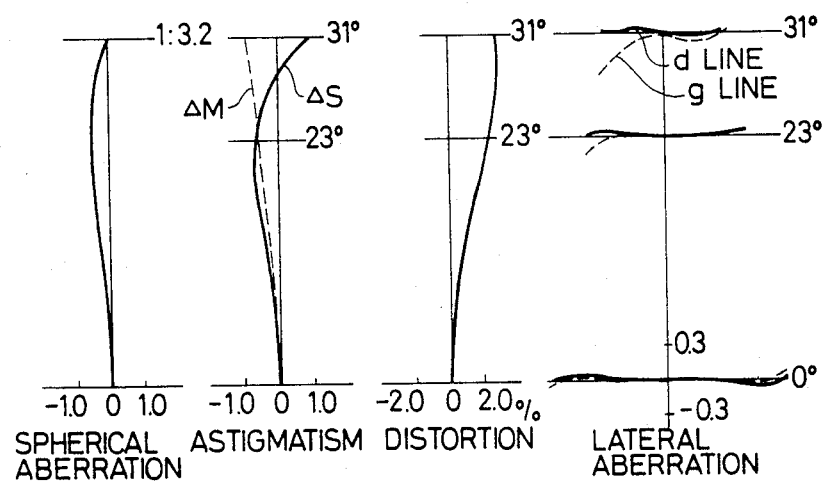

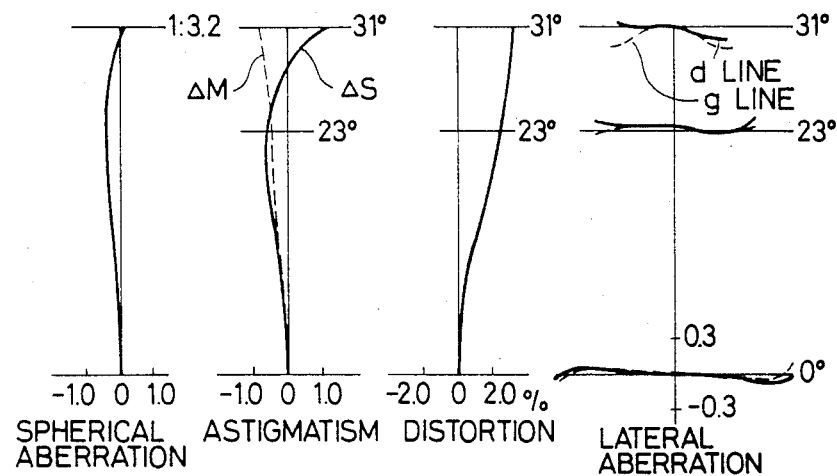
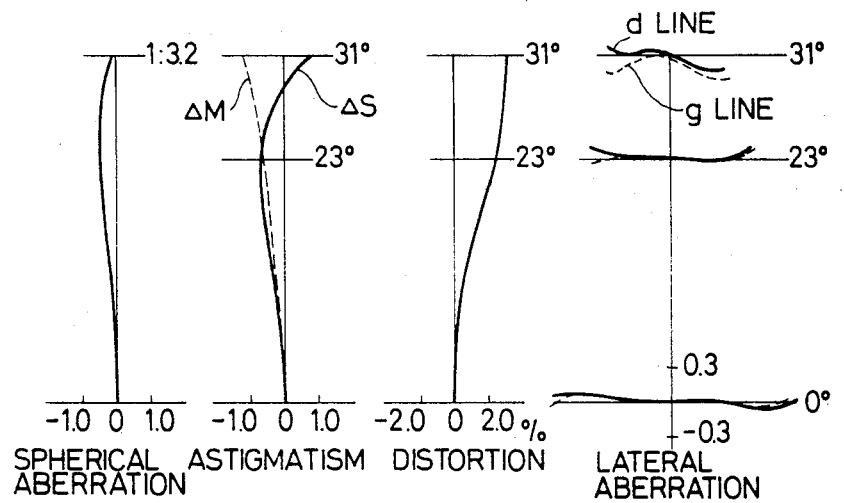

SMALL-SIZE WIDE ANGLE LENS

BACKGROUND OF THE INVENTION

1. Field of the Invention

The present invention relates to a small-size wide angle photographic lens having a refractive power arrangement of a so-called telephoto type.

2. Description of the Prior Art

With the recent trend of smaller and thinner cameras, lenses used therefor have been desired to have a small distance from the front of the lens to the image plane.

To this end, there is one method in which the focal length of the lens is made short to provide a wide angle lens. It is also known to be advantageous to provide a so-called telephoto type in which a convergent positive lens system is arranged in the front group whereas a divergent negative lens system is arranged in the rear group. However, the telephoto type is originally advantageous in structure as a lens of a narrow angle of view. If the wide angle is provided while maintaining a large spacing between the convergent lens system in the front group and the divergent lens system in the rear group necessary for decreasing the telephoto ratio, both the front and rear groups abnormally increase in lens aperture, deteriorating the aberration accordingly. Therefore, it has been difficult to increase the aperture ratio and to increase the angle of view.

Small-size wide angle lenses of the telephoto type as described above have been often found in well known publications, which have the rear group in the form of a negative meniscus single lens in which convex surface is directed toward the image. In these lenses, however, the spacing between the front group and the rear group is large, and therefore, the diameter of the lens in the rear group is large. Thus, the increase in aperture ratio and the increase in angle of view give rise to the deterioration of aberration. For example, there have been proposed wherein the aperture ratio is merely 1:3.5 with respect to the angle of the view 63° (Japanese Patent Publication No. 50248/81) and wherein the structure similar to the former is provided and the aperture ratio is 1:2.8 which is brighter with the result that the angle of view becomes narrow, 59.4°, which involves difficulties in coma aberration, chromatic aberration of magnification, difference due to color of coma aberration, etc. (Japanese Patent application Laid-Open No. 75612/81) and the like. These proposals are not yet sufficient in terms of performance.

In addition, these divergent lenses in the rear group comprise a meniscus negative lens having a deep concave surface towards the object, and therefore, said concave surface adversely affects the coma aberration. To cope with this, proposals have been recently made in which aspherical configuration is used in the lens of the rear group to improve the coma aberration. However, these proposals involve various problems in manufacture, and it is apparent to be advantageous in that the lens may be constructed only by the spherical configuration.

SUMMARY OF THE INVENTION

A lens system in accordance with the present invention comprises five lenses comprising, in order from the object, a front group having a convergent action which comprises a first lens in the form of a meniscus positive lens wherein a convex surface is directed towards the object, a second lens in the form of a biconcave negative lens and a third lens in the form of a biconcave positive lens, and a rear group having a divergent action which comprises a fourth lens and a fifth lens, both of which are in the form of a negative meniscus lens wherein a convex surfce is directed towards the image, the lens system being satisfied with the following conditions:

$$0.7f < |f4.5| < 1.0f \quad \text{(i)}$$

$$f4 < f5 \quad \text{(ii)}$$

$$1.2 < r7/r9 < 3.5 \quad \text{(iii)}$$

$$0.09f < d6 < 0.15f \quad \text{(iv)}$$

$$29 < \nu3 < 48 \quad \text{(v)}$$

where f is the resultant focal length of the whole system, f4 and f5 are the focal length of the fourth and fifth lenses, respectively, f4.5 are the resultant focal length of the fourth and fifth lenses, r7 and r9 are the radius of curvature of the spherical surface on the object side of the fourth and fifth lenses, respectively, d6 is the air spacing between the third and fourth lenses, and $\nu3$ is the Abbe's number of a glass material for the third lens.

The present invention may provide a small-size wide angle lens wherein the rear group is composed of two negative meniscus lenses with a convex surface directed towards the image to thereby improve the coma aberration, the increase in telephoto ratio, the larger-size of lens system and the like resulting therefrom are solved by imparting the specific conditions to these lenses in the rear group, and the correction of aberration can be made satisfactorily with the aperture ratio 1:3.2 and the angle of view 62° or more without increasing the aperture of the rear group despite the fact that the lens is merely composed of spherical lenses.

BRIEF DESCRIPTION OF THE DRAWINGS

FIGS. 2(a)–2(d) are curves of aberrations of embodiment 2;

FIGS. 3(a)–3(d) are curves of aberrations of embodiment 3;

FIGS. 4(a)–4(d) are curves of aberrations of embodiment 4;

FIGS. 5(a)–5(d) are curves of aberrations of embodiment 5; and

FIGS. 6(a)–6(d) are curves of aberrations of embodiment 6.

DETAILED DESCRIPTION OF THE INVENTION AND PREFERRED EMBODIMENTS

Figure 1:
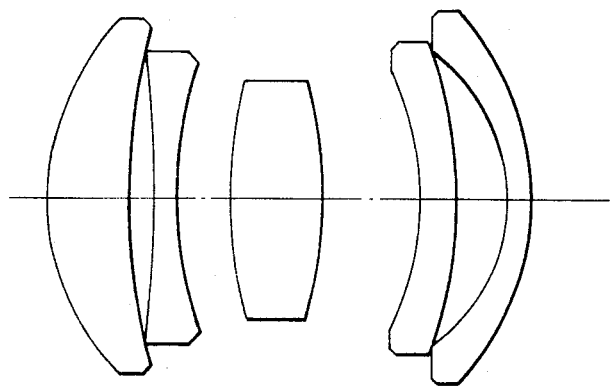
FIG. 1 is a sectional view showing the structure of embodiment 1 of a small-size wide angle lens in accordance with the present invention.

In the lens of the present invention, the abovedescribed conditions (i) to (v) have the meaning as follows:

The condition (i) is the condition necessary for making the telephoto ratio small, approximately 1. To make the telephoto ratio small, it is advantageous to intensify the negative refractive power of the rear group, but if the refractive power is excessively intensified, a spool type distortion aberration increases, rendering the correction difficult with only the shape of the lens. The lower limit of the condition (i) is the limitation for that purpose. Conversely, if the negative refractive force of the rear group is excessively weakened, the telephoto ratio becomes great, failing to achieve the miniaturization which forms one of objects of the present invention. The upper limit of the condition (i) is the limitation for that purpose.

The condition (ii) is the condition for maintaining the coma aberration good. In prior art system in which the rear group is composed of a negative meniscus single lens with a convex surface directed towards the image, the convex spherical surface is deepened with respect to light passing through the peripheral edge portion of the rear group, and it is difficult to satisfactorily correct the coma aberration resulting therefrom over the whole frame. When the aperture ratio or the angle of view is made large, the coma aberration abruptly deteriorates and it becomes more difficult to obtain a good state of aberration correction. In the present invention, the lens system of the rear group is divided into two negative meniscus lenses composed of the fourth and fifth lenses with the convex surface directed towards the image to thereby relieve the burden of the refractive power of individual lenses and to make the aperture ratio bright, 1:3.2, and in addition, even if the wide angle lens having the angle of view in excess of 62° is provided, the coma aberration may be satisfactorily corrected over the whole frame. The sharing rate of the refractive power of the fourth and fifth lenses of the rear group is that to maintain the coma aberration good and to make the telephoto ratio small, approximately 1, it is effective to set the focal lengths to f4<f5 under the condition (i). If this condition is not satisfied, the excessive correction of coma aberration occurs and the telephoto rate also increases.

The condition (iii) relates to the share of the divergent action of refractive surfaces on the object sides of the fourth and fifth lenses, respectively, belonging to the rear group for maintaining various aberrations, particularly, spherical aberration, coma aberration and image plane curve good. The first surface of the rear group, that is, the spherical surface r7 on the object side of the fourth lens has a greater influence on the spherical aberration than that of the coma aberration whereas r9 which is the spherical surface on the object side of the fifth lens has a greater influence on the coma aberration than that of the spherical aberration. Accordingly, it is necessary to suitably determine the ratio between r7 and r9 in order to obtain a good state of aberration correction. If the condition exceeds the lower limit, the spherical aberration is surplus in correction, and as a result, the positive frame becomes great, and in addition, the flatness of the image plane lacking in spherical configuration deteriorates and therefore, the lens cannot be used as a wide angle lens. Conversely, if the condition exceeds the upper limit, the spherical aberration is short in correction.

The condition (iv) relates to the spacing between the third and fourth lenses, that is, to the air spacing between the front group and the rear group, whereby the telephoto ratio is restrained to be small, approximately 1, to prevent an increase in outside diameter of the lens and to provide a good aberration. To make the telephoto ratio small, it is advantageous in that the aforesaid spacing d6 is made large, but to maintain the increase in angle of view and the quantity of peripheral light, the aperture of the front group and the rear group, particularly, the aperture of the rear group must be made large, and therefore, the upper limit of the condition (iv) is brought forth. Conversely, if d6 is made small, the telephoto ratio becomes great, and if the condition exceeds the lower limit, the telephoto ratio cannot be made small to approximately 1 and in addition, Petzval's sum increases to deteriorate the flatness of the image plane lacking in spherical configuration.

The condition (v) is provided to remove a difference due to the color of coma aberration. If the diaphragm is placed behind the third lens, only the first, the second and the third lenses ahead of the diaphragm may be drawn for adjustment of focal point to simplify the construction of a lens mount. However, on the other side, this increases the aperture of the first and second lenses. This tendency is conspicuous as the angle of view increases, and the difference due to the color of coma aberration caused by the second lens is difficult in correction in short wavelength. Such a drawback is also found in a triplet or a tessar with post diaphragm wherein the diameter of the front lens increases. However, those which solve this problem rarely exist. It has been discovered in the present invention that the use of a diffusive material, that is, a material having a small $\nu 3$ in the third lens is extremely effective to correct the difference due to the color of coma aberration which abruptly increases beyond the semi angle of view 25°. The upper limit of the condition (v) is the limitation for maintaining the difference due to the color of coma aberration, and if exceeding this limit, the frame of light passing through the peripheral edge portion of the front lens at an angle over the semi angle of view 25° increases particularly in the short wavelength. Furthermore, if the value of $\nu 3$ is too small, it is difficult to simultaneously remove the chromatic aberration on the axis and the chromatic aberration of magnification In the following, the embodiments of the present invention will be illustrated.

| Embodiment 1 $f = 100$  1:3.2  Angle of view 62° | | | |
|---|---|---|---|
| r1 = 29.452 | | | |
| | d1 = 9.8 | n1 = 1.72 | ν1 = 50.34 |
| r2 = 101.447 | | | |
| | d2 = 2.44 | | |
| r3 = −141.034 | | | |
| | d3 = 2.59 | n2 = 1.78472 | ν2 = 25.70 |
| r4 = 45.397 | | | |
| | d4 = 6.08 | | |
| r5 = 56.782 | | | |
| | d5 = 10.17 | n3 = 1.66446 | ν3 = 35.89 |
| r6 = −69.156 | | | |
| | d6 = 11.5 | | |
| r7 = −34.675 | | | |
| | d7 = 4.24 | n4 = 1.57501 | ν4 = 41.51 |
| r8 = −45.397 | | | |
| | d8 = 5.93 | | |
| r9 = −20.081 | | | |
| | d9 = 2.88 | n5 = 1.57501 | ν5 = 41.51 |
| r10 = −29.225 | | | |
| bf = 44.409 | | Telephoto ratio = 1.00 | |
| f4 = −298.4 | | f5 = −126.1 | |
| f4.5 = −85.68 | | | |

| Embodiment 2 $f = 100$  1:3.2  Angle of view 62° | | | |
|---|---|---|---|
| r1 = 29.278 | | | |
| | d1 = 9.71 | n1 = 1.713 | ν1 = 53.94 |
| r2 = 105.0 | | | |
| | d2 = 2.41 | | |
| r3 = −140.182 | | | |

-continued

Embodiment 2
f = 100   1:3.2   Angle of view 62°

|   |   |   |   |
|---|---|---|---|
|   | d3 = 2.74 | n2 = 1.78472 | v2 = 25.70 |
| r4 = 46.144 |   |   |   |
|   | d4 = 6.33 |   |   |
| r5 = 55.580 |   |   |   |
|   | d5 = 9.86 | n3 = 1.65446 | v3 = 33.72 |
| r6 = −68.221 |   |   |   |
|   | d6 = 10.89 |   |   |
| r7 = −36.032 |   |   |   |
|   | d7 = 4.64 | n4 = 1.57501 | v4 = 41.51 |
| r8 = −46.076 |   |   |   |
|   | d8 = 5.6 |   |   |
| r9 = −20.242 |   |   |   |
|   | d9 = 2.92 | n5 = 1.59270 | v5 = 35.45 |
| r10 = −30.898 |   |   |   |
| bf = 44.497 |   | Telephoto ratio = 0.996 |   |
| f4 = −345.8 |   | f5 = −110.3 |   |
| f4.5 = −80.44 |   |   |   |

Embodiment 3
f = 100   1:3.2   Angle of view 62°

|   |   |   |   |
|---|---|---|---|
| r1 = 29.361 |   |   |   |
|   | d1 = 8.73 | n1 = 1.717 | v1 = 47.99 |
| r2 = 108.605 |   |   |   |
|   | d2 = 2.47 |   |   |
| r3 = −155.356 |   |   |   |
|   | d3 = 3.15 | n2 = 1.78472 | v2 = 25.71 |
| r4 = 46.863 |   |   |   |
|   | d4 = 6.57 |   |   |
| r5 = 63.168 |   |   |   |
|   | d5 = 11.45 | n3 = 1.70154 | v3 = 41.10 |
| r6 = −75.701 |   |   |   |
|   | d6 = 11.1 |   |   |
| r7 = −35.211 |   |   |   |
|   | d7 = 3.45 | n4 = 1.51633 | v4 = 64.15 |
| r8 = −45.591 |   |   |   |
|   | d8 = 5.83 |   |   |
| r9 = −21.005 |   |   |   |
|   | d9 = 3.0 | n5 = 1.65844 | v5 = 50.85 |
| r10 = −31.237 |   |   |   |
| bf = 44.141 |   | Telephoto ratio = 0.999 |   |
| f4 = −337.8 |   | f5 = −110.2 |   |
| f4.5 = −80.78 |   |   |   |

Embodiment 4
f = 100   1:3.2   Angle of view 62°

|   |   |   |   |
|---|---|---|---|
| r1 = 29.608 |   |   |   |
|   | d1 = 9.9 | n1 = 1.72 | v1 = 50.34 |
| r2 = 101.078 |   |   |   |
|   | d2 = 2.51 |   |   |
| r3 = −142.933 |   |   |   |
|   | d3 = 2.51 | n2 = 1.78472 | v2 = 25.70 |
| r4 = 44.932 |   |   |   |
|   | d4 = 6.07 |   |   |
| r5 = 56.614 |   |   |   |
|   | d5 = 10.0 | n3 = 1.66446 | v3 = 35.89 |
| r6 = −71.166 |   |   |   |
|   | d6 = 13.08 |   |   |
| r7 = −27.921 |   |   |   |
|   | d7 = 4.65 | n4 = 1.57501 | v4 = 41.51 |
| r8 = −37.257 |   |   |   |
|   | d8 = 6.27 |   |   |
| r9 = −20.899 |   |   |   |
|   | d9 = 2.06 | n5 = 1.57501 | v5 = 41.51 |
| r10 = −28.224 |   |   |   |
| bf = 43.125 |   | Telephoto ratio = 1.00 |   |
| f4 = −236.8 |   | f5 = −156.1 |   |
| f4.5 = −90.28 |   |   |   |

Embodiment 5
f = 100   1:3.2   Angle of view 62°

Figures 2A, 2B, 2C, 2D:
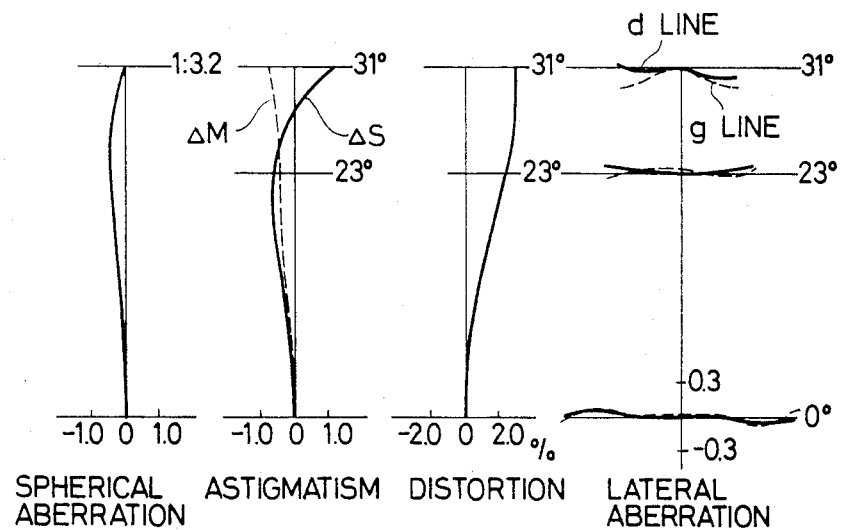
FIGS. 2(a)–2(d) are curves of aberrations of embodiment 1.

|   |   |   |   |
|---|---|---|---|
| r1 = 29.547 |   |   |   |
|   | d1 = 9.35 | n1 = 1.72 | v1 = 50.34 |
| r2 = 101.328 |   |   |   |
|   | d2 = 2.4 |   |   |
| r3 = −138.831 |   |   |   |
|   | d3 = 2.53 | n2 = 1.78472 | v2 = 25.70 |
| r4 = 46.337 |   |   |   |
|   | d4 = 6.38 |   |   |
| r5 = 57.048 |   |   |   |
|   | d5 = 10.37 | n3 = 1.66446 | v3 = 35.89 |
| r6 = −70.037 |   |   |   |
|   | d6 = 10.19 |   |   |
| r7 = −54.787 |   |   |   |
|   | d7 = 3.27 | n4 = 1.57501 | v4 = 41.51 |
| r8 = −71.995 |   |   |   |
|   | d8 = 6.9 |   |   |
| r9 = −19.574 |   |   |   |
|   | d9 = 2.89 | n5 = 1.57501 | v5 = 41.51 |
| r10 = −30.174 |   |   |   |
| bf = 45.45 |   | Telephoto ratio = 0.997 |   |
| f4 = −428.4 |   | f5 = −107.6 |   |
| f4.5 = −84.05 |   |   |   | where,
r are the radius of curvature of the spherical surface
d are the lens thickness on the axis or the air spacing
n are the refractive index with respect to the line d of each lens
v are Abbe's number of each lens
f is the focal length of the whole
bf is the back focus
f4 is the focal length of the fourth lens
f5 is the focal length of the fifth lens
f4.5 is the resultant focal length of the fourth and fifth lenses FIGS. 2 to 6 show the aberration curves of embodiment 1 to embodiment 5, respectively. The lateral aberration shows 70% image height and 100% image height on axes of line d and line g, respectively. All the aberrations are well corrected, and the coma aberration of the short wavelength is also found to be extremely excellent as a wide angle lens of the type in which the diaphragm is provided behind the front group.

What is claimed is:

1. A small size wide angle lens having five-lenses and comprising, in order from the object, a front group having a convergent action which comprises a first lens in the form of a meniscus positive lens wherein a convex surface is directed towards the object, a second lens in the form of a biconcave negative lens and a third lens in the form of a biconvex positive lens, and a rear group having a divergent action which comprises a fourth lens and a fifth lens, both of which are in the form of a negative meniscus lens wherein a convex surface is directed towards the image, characterized in that the following conditions are met:

$$0.7f < |f4.5| < 1.0f \tag{i}$$

$$f4 < f5 \tag{ii}$$

$$1.2 < r7/r9 < 3.5 \tag{iii}$$

$$0.09f < d6 < 0.15f \tag{iv}$$

$$29 < v3 < 48 \tag{v}$$

where f is the resultant focal length of the whole system, f4 and f5 are the focal length of the fourth and fifth lenses, respectively, f4.5 are the resultant focal length of the fourth and fifth lenses, r7 and r9 are the radius of curvature of the spherical surface on the object side of the fourth and fifth lenses, respectively, d6 is the air spacing between the third and fourth lenses, and v3 is the Abbe's number of a glass material for the third lens.

* * * * *